Dec. 10, 1957 C. GERST 2,815,836
CARRIER-CONTROLLED PLANETARY GEAR UNIT
Original Filed Oct. 7, 1950 5 Sheets-Sheet 1

INVENTOR.
CHRIS GERST
BY
ATT

Dec. 10, 1957     C. GERST     2,815,836
CARRIER-CONTROLLED PLANETARY GEAR UNIT
Original Filed Oct. 7, 1950     5 Sheets-Sheet 3

INVENTOR.
CHRIS GERST
BY
Gustav A. Wolff
ATT.

Dec. 10, 1957  C. GERST  2,815,836
CARRIER-CONTROLLED PLANETARY GEAR UNIT
Original Filed Oct. 7, 1950

INVENTOR.
CHRIS GERST
BY
Gustav A. Wolff
ATT.

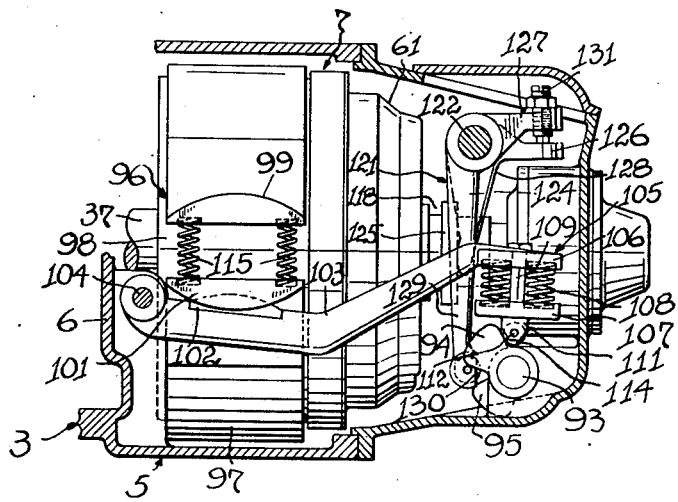

United States Patent Office 2,815,836
Patented Dec. 10, 1957

2,815,836

CARRIER-CONTROLLED PLANETARY GEAR UNIT

Chris Gerst, Detroit, Mich.

Original application October 7, 1950, Serial No. 188,947, now Patent No. 2,741,130, dated April 10, 1956. Divided and this application March 1, 1952, Serial No. 274,315

1 Claim. (Cl. 192—12)

This application is a division of my copending application Serial Number 188,947, filed October 7, 1950, now Patent No. 2,741,130, dated April 10, 1956.

This invention relates in general to multi-speed transmissions and, more particularly, to multi-speed transmissions of the planetary type and, while not limited thereto, has special reference to vehicles with rotary devices individually driven by individual power units as for example truck mixers with mixing drums driven by individual power units.

The general object of the invention is the provision of a multispeed, reversible transmission of the planetary type constructed to control forward and reverse rotation of its output shaft by a planetary clutch device embodying spring-loaded clutch means and planetary drive means cooperating with each other in effecting selective forward and reverse rotation of the output shaft of the transmission.

Another object of the invention is the provision of a multi-speed, reversible transmission of the planetary type constructed to control multi-speed forward and reverse rotation of its output shaft by a planetary clutch device, the transmission including multi-speed gearing and a planetary clutch device coupling the gearing with the output shaft of the transmission, and the planetary clutch device embodying spring-loaded clutch means and planetary drive means directly coupled with each other for cooperation in effecting selective forward and reverse rotation of the output shaft of the transmission.

A further object of the invention is the provision of a multi-speed, reversible transmission of the planetary type constructed to control multi-speed forward and reverse rotation of its output shaft by a planetary clutch device, the transmission including multi-speed gearing mounted in a main housing and having an input shaft extended through one side wall of the main housing and a planetary clutch device coupled with said gearing and the output shaft of the transmission and mounted in a clutch housing arranged at the side of the main housing opposite to said one side wall thereof, the planetary clutch device embodying spring-loaded clutch means and planetary drive means directly coupled with each other for cooperation in effecting selective forward and reverse rotation of the output shaft of the transmission.

In addition the invention has other marked superiorities which clearly distinguish it from presently known structures. These improvements or superiorities, embodying certain novel features of construction, are clearly set forth in the following specification and the appended claim; and a preferred form of embodiment of the invention is hereinafter shown with reference to the accompanying drawings forming part of the specification.

Figure 1:
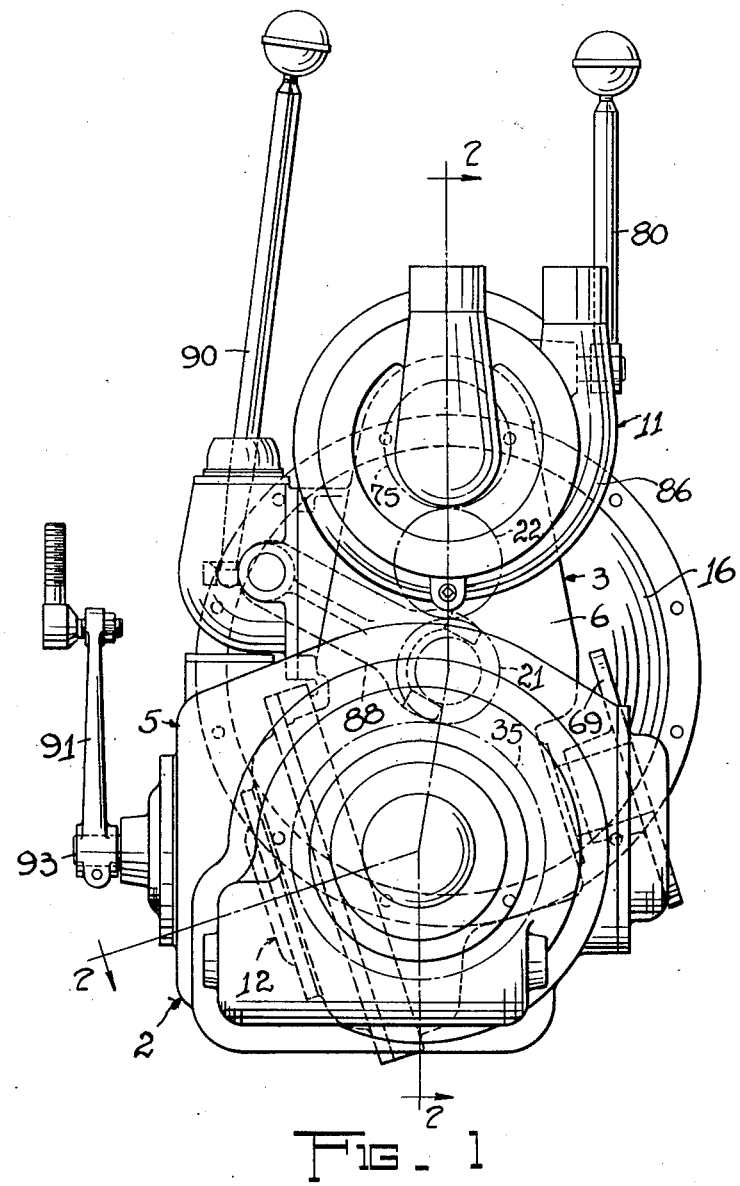
Fig. 1 is a front elevation of a multi-speed, reversible transmission of the planetary type constructed in accordance with the invention.

Fig. 7 is a fragmentary longitudinal sectional view showing in side elevation the controlling elements for the clutch and brake means of the planetary clutch device, the section being taken on line 7—7 of Fig. 1 and the controlling elements being positioned for forward drive of the output shaft; and Fig. 8 is a view similar to Fig. 7, the controlling elements being positioned for reverse drive of the output shaft.

Referring now more particularly to the exemplified form of the invention shown in the drawings, reference numeral 2 denotes a composite housing embodying a main housing 3 for a multi-speed gear drive 4, a main clutch housing 5 arranged adjacent to side wall 6 of main housing 3 for a planetary drive and clutch arrangement 7, a secondary clutch housing 8 arranged adjacent to side wall 6 above main clutch housing 5 for a clutch 9, which secondary clutch housing mounts on its end wall 10 a centrifugal pump 11, and a housing portion 12 laterally extended from main housing 3 in angular relation with respect thereto for an output shaft assembly 14 angularly related to the input shaft 15 of the transmission.

Main housing 3, as customary, includes a flanged housing bell 16 to permit attaching of housing 3 to the housing of a power unit not shown and freely rotatably supports in a ball bearing 17 the inner end portion 18 of input shaft 15 of multi-speed gear drive 4, which input shaft has its end portion 19 connected to a fluid coupling 20. Input shaft 15 includes at its inner end a drive pinion 21 meshing with a gear 22 on a counter shaft 23 and rotatably supports in an axial bore 24 in a ball bearing 25 one end of a driven shaft 26 which is extended with its other end 27 through side wall 6 and journaled in such side wall by means of a ball bearing 28. Shaft 26 includes a splined central portion 29 to slidably and non-rotatably support a gear 30 arranged to be shifted either into mesh with a gear 31 on counter shaft 23 or into clutching engagement with the internally splined portion 32 of bore 24 in the drive pinion 21 to engage with clutch teeth 33 the splined portion 32 of bore 24.

Figure 2:
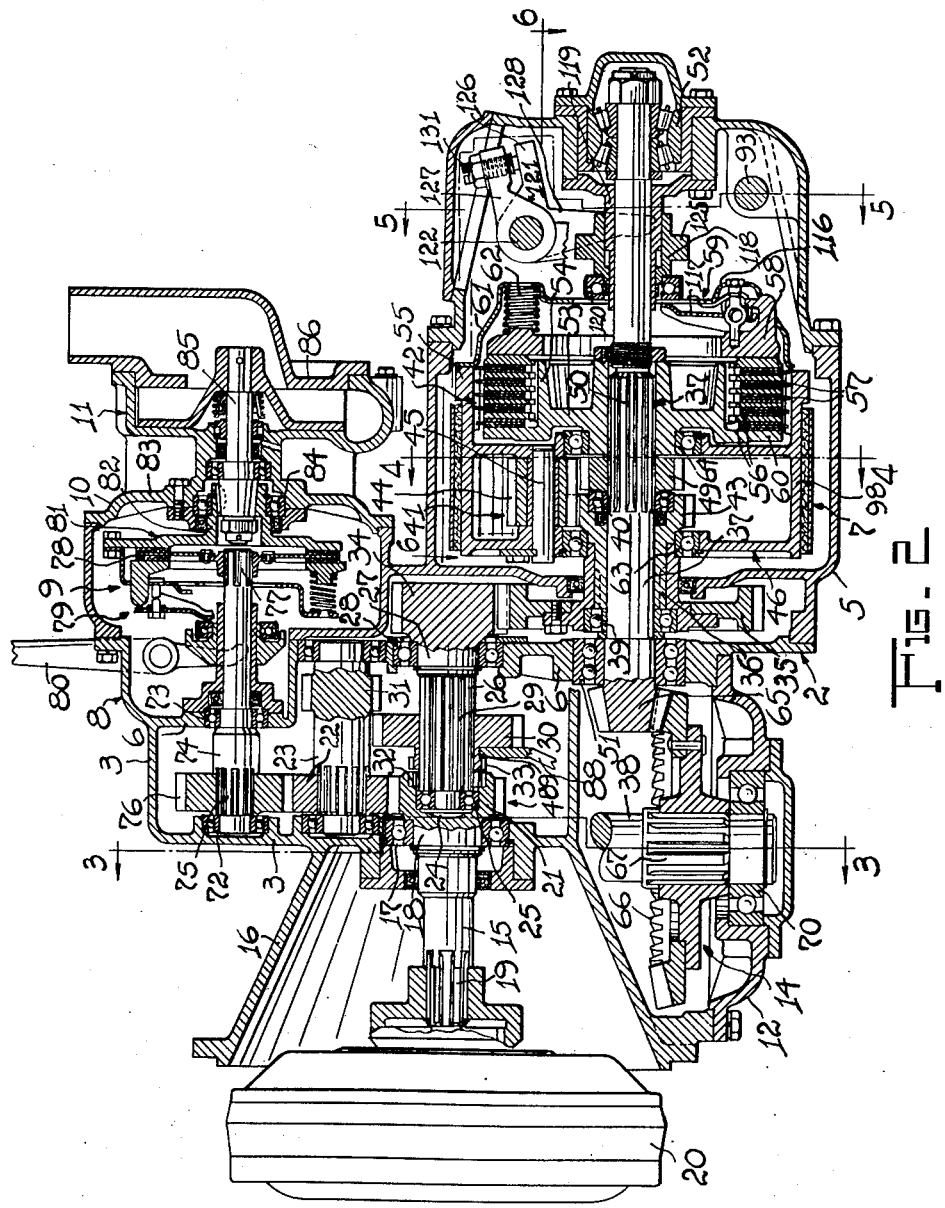
Fig. 2 is a longitudinal sectional view through the transmission shown in Fig. 1, the section being taken on line 2—2 of Fig. 1.
Figure 3:
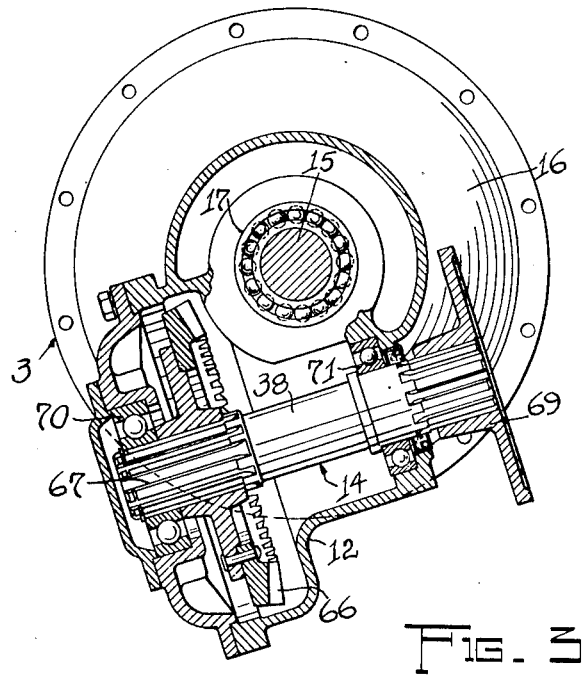
Fig. 3 is a transverse sectional view showing the assembly of the output shaft arrangement of the transmission, the section being taken on line 3—3 of Fig. 2.
Figure 4:
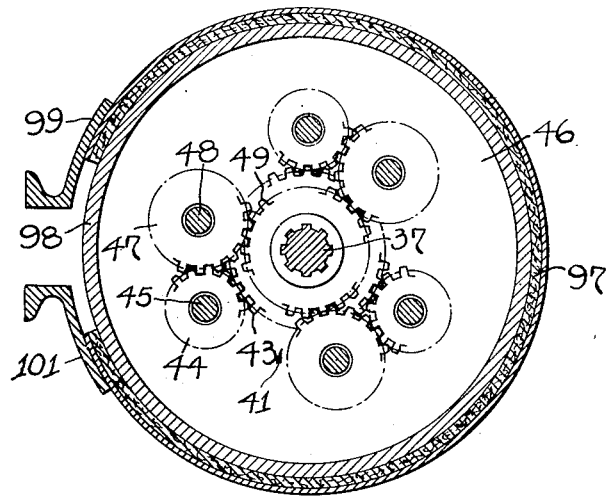
Fig. 4 is a transverse, somewhat diagrammatic sectional view showing the planetary drive arrangement of the transmission, the section being taken on line 4—4 of Fig. 2.
Figure 5:
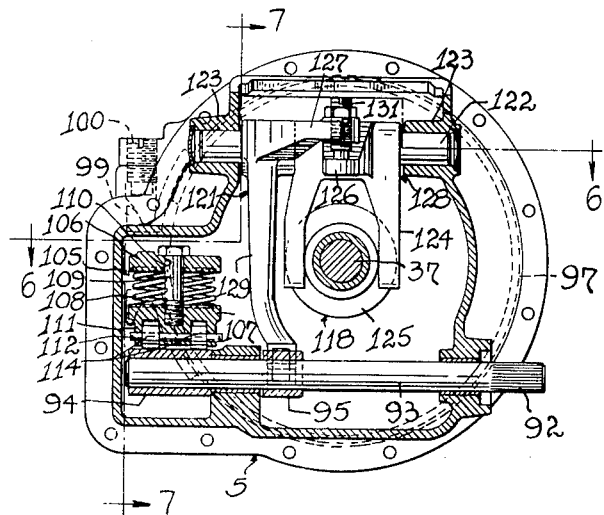
Fig. 5 is a transverse sectional view showing the assembly of the controlling elements for the clutch and brake means of the planetary clutch device, the section being taken on line 5—5 of Fig. 2.
Figure 6:
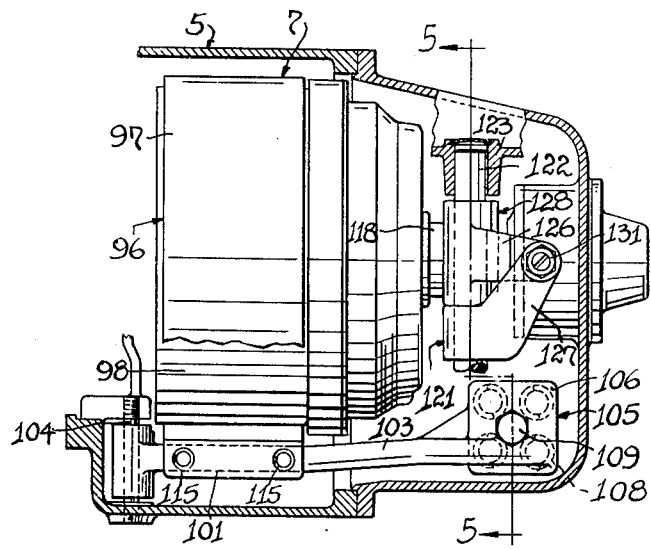
Fig. 6 is a fragmentary longitudinal sectional view showing the assembly of the controlling elements for the clutch and brake means of the planetary clutch device, the section being taken on line 6—6 of Fig. 2.

Shaft 26 carries at its extended end 27 a pinion 34 which meshes with a large gear 35 keyed to a tubular shaft 36 which forms one of the elements of planetary drive and clutch arrangement 7. This tubular shaft has axially extended therethrough shaft 37 adapted to be selectively rotated in opposite directions by planetary drive and clutch arrangement 7. Shaft 37 transfers its rotation to output shaft 38 of output shaft assembly 14. The gear 35 and tubular shaft 36 are journaled on shaft 37 by ball bearings 39 and 40, as will readily be seen from inspection of Fig. 2.

Planetary drive and clutch arrangement 7 embodies a planetary drive structure 41 and a spring-loaded clutch structure 42 directly coupled therewith. Planetary drive structure 41 consists of a sun gear 43 formed as an integral part of tubular shaft 36 and meshes with three planet gears 44 journaled on stud shafts 45 which are mounted on a freely rotatably supported planet gear carrier 46. These planet gears mesh with three idler planet gears 47 journaled on stud shafts 48 also mounted on planet gear carrier 46, which idler planet gears mesh with a gear 49 on the splined portion 50 of shaft 37 journaled in bearings 51 and 52. Clutch structure 42 embodies a main body portion 53 which is mounted on the splined portion 50 of shaft 37 and includes a splined circumferential flange 54 encircled in radially spaced relation by an internally splined, laterally extended flange 55 on planet gear carrier 46. Flanges 54 and 55 non-rotatably and laterally shiftably support cooperating sets of friction disks 56 and 57 arranged to frictionally engage each other when shifted by the yielding force of the ring-shaped, spring-pressed clamping plate member 58 of a clamping plate structure 59 toward a backing plate 60 integrally extended from body portion 53.

Clamping plate structure 59 embodies a cover member 61 secured to flange 55 of planet gear carrier 46, which cover member mounts in recessed areas pre-loaded springs 62 yieldingly forcing the ring-shaped clamping plate member 58 toward backing plate 60.

Planetary drive and clutch arrangement 7 has its planetary drive structure 41 and spring-loaded clutch 42 directly coupled with each other by planet gear carrier 46 rotatably mounted on tubular shaft 36 and body 53 by ball bearings 63 and 64. The planetary drive and clutch arrangement affords a simple and economic means to effect forward and reverse rotation of shaft 37 and stoppage of rotation of such shaft. Thus, when clutch 42 is activated, rotation of tubular shaft 36 by gear 35 is directly transferred to shaft 37 through planet gears 44, idler planet gears 47 and gear 49, the gears being then non-rotatably interlocked with each other due to the coupling of planet gear carrier 46 with main body portion 53 of clutch 42. In this case, tubular shaft 36 and shaft 37 rotate in the same direction at the same speed. When clutch 42 is inactivated in a manner later to be described, rotation of tubular shaft 36 by gear 35 is transferred to shaft 37 through planet gears 44 and 47 and gear 49 to shaft 37. In this case, rotation of shaft 37 is resisted, whereas rotation of planet gear carrier 46 is unimpeded so that planet gears 44 and 47 effect idling of planet gear carrier 46 around shaft 37. When clutch 42 is inactivated and planet gear carrier 46 held at a standstill in a manner later to be described, rotation of tubular shaft 36 is transferred to shaft 37 through planet gears 44, 47 and 49, so that shaft 37 is rotated in a reverse direction to the direction of rotation of tubular shaft 36.

To transfer rotation of shaft 37 to output shaft 38, the shaft 37 is extended into housing portion 12 and provided at its extended portion with a bevel pinion 65 meshing with a large bevel gear 66 on the splined inner portion 67 of output shaft 38. This output shaft, which carries on its splined outer portion 68 a coupling flange 69 and is angularly related to shaft 37, is journaled in ball bearings 70 and 71.

Multi-speed gear drive 4 effects also driving of a clutch controlled centrifugal pump. For such purpose main housing 3 rotatably mounts in ball bearings 72 and 73 a counter shaft 74 carrying on its splined inner end 75 a gear 76 meshing with gear 22. Shaft 74 extends through the side wall 6 of the main housing 3 into the secondary clutch housing 8 and mounts on its splined end 77 a friction disk assembly 78 of spring-loaded friction clutch 9 having a throw-out device 79 of common construction actuated by a clutch lever 80. Friction clutch 9 embodies backing plate structure 81, the hub portion 82 of which is journaled in side wall 83 of the clutch housing 8, a ball bearing 84 being used for this purpose, and is keyed to the inner end portion of a shaft 85 for the centrifugal pump 11, the housing 86 of which is supported on the side wall 83 of clutch housing 8.

Multi-speed gear drive 4 is shifted into different speeds by a fork 88 engaged with a grooved hub 89 on shiftable gear 30. This fork is actuated by a gear shift lever 90 and effects shifting of gear 30 into engagement with gear 31 or direct coupling of input shaft 15 with shaft 26 when clutch teeth 33 of gear 30 engage the internally splined portion 32 of drive pinion 21.

Planetary drive and clutch arrangement 7 is shifted to forward and reverse drive positions by a shifting lever 91 coupled with the outwardly extended end portion 92 of a cam shaft 93. This cam shaft mounts cams 94 and 95 which actuate upon a brake arrangement 96 adapted to stop rotation of planet gear carrier 46 and spring-loaded clutch 42. The brake arrangement 96 embodies a brake band 97 which partly encircles a peripheral flange 98 on planet gear carrier 46. Brake band 97 has one end 99 adjustably secured to main clutch housing 5, a screw member 100 engaged with said end and threadedly connected with said housing being used for this purpose. Brake band 97 engages with its other end 101 the curved seat 102 of a brake lever 103 pivotally supported on main clutch housing 5 by a pin 104. Brake lever 103 mounts on its free end a cam roller carrier 105 embodying oppositely arranged plate members 106 and 107 spaced from each other by compression springs 108 pretensioned by a bolt 109 freely extended through a bore 110 in plate member 106 and secured to plate member 107. Bolt 109 partly compresses the springs between plate members 106 and 107 and permits further compression of springs 108 when under load. Plate member 107 includes ear portions 111 supporting a pin 112 which pivotally mounts cam roller 114 engaging cam 94 in shifting brake lever 103 to effect frictional engagement of brake band 97 with flange 98 of planet gear carrier 46 against the tension of spreader springs 115 arranged between the opposed ends 99 and 101 of the brake band.

Spring-loaded clutch 42 is inactivated when the spring-pressed clamping plate member 58 thereof is shifted against the force of springs 62 toward the side wall 116 of cover 61 of the clamping structure by a lever 117 pivoted to such cover. Such shifting of clamping plate member 58 is effected by a collar member 118 slidably mounted on a tubular flanged member 119 which is secured to main clutch housing 5 and has shaft 37 extended therethrough. Collar member 118 mounts a thrust bearing 120 engaged with the end of lever 117 to effect shifting of clamping plate member 58 into inoperative position and therewith inactivation of the clutch 42 when collar member 118 is shifted toward the clutch. Such shifting of the collar member is effected by two cooperating bell cranks 121 and 128 mounted on a pivot shaft 122 pivoted in bearings 123 on main clutch housing 5. Bell crank 128 includes a fork-shaped arm 124 engaged with a rib 125 on collar member 118 and has its second arm 126 engaged by the short arm 127 of bell crank 121 which mounts on its long arm 129 a roller 130 engaging cam 95 on cam shaft 93 and carries on its short arm 127 an adjustable set screw 131 engaged with the arm 126 of bell crank 128 to permit angular adjustment of the bell cranks with respect to each other for take up on clutch 42 in case of wear of its sets of friction disks 56, 57.

The construction of cam roller carrier 105 with pretensioned compression springs 108 arranged between the opposed shiftably related plate members 106 and 107 permits smooth frictional engagement of brake band 97 with peripheral flange 98 on planet gear carrier 46 and automatic adjustment of the brake band in case of wear.

In operation of the two-speed forward and reverse transmission rotation of output shaft 38 at different speeds is effected by gear shift lever 90. Low speed rotation of output shaft 38 is attained when shiftable gear 30 is shifted into engagement with gear 31, and high speed rotation of such output shaft is attained when shiftable gear 30 is directly coupled with drive pinion 21. The forward and reverse rotation of output shaft 38 is controlled by planetary drive and clutch arrangement 7. Thus, forward rotation of such output shaft is brought about by activation of spring-loaded clutch 42 and inactivation of brake arrangement 96 by shifting lever 91. This lever is coupled with cam shaft 93 and when shifted for forward rotation of output shaft 38 rotates cam shaft 93 to a position in which the cams 94 and 95 are out of engagement with their cam rollers 114 and 130 (see Fig. 7). A reverse rotation of output shaft 38 is brought about by release of spring-loaded clutch 42 and activation of brake arrangement 96 by shifting lever 91. In this case lever 91 is shifted to rotate cam shaft 93 to a position in which the two cams 94 and 95 are both engaged with their cam rollers 114 and 130 (see Fig. 8). Activation of brake arrangement 96 to arrest rotation of planet gear carrier 46 can be brought about only when clutch 42 is inactivated. To accomplish this cams 94 and 95 are mounted on cam shaft 93 in such a manner that in shifting operations for a forward drive, clutch 42 is first inactivated and thereafter brake arrangement 96 is activated, and in shifting operations for a reverse drive, brake arrangement 96 is first inactivated and thereafter clutch 42 is activated by release of its throw-out lever, the fork-shaped arm 124 of bell crank 121.

Having thus described my invention, what I claim is:

In the combination of a carrier-controlled forward and reverse planetary gear unit including spring-loaded clutch means and spring-release brake means, a single control means adapted to effect release of the spring-loaded clutch means and actuation of the spring-release brake means in timed relation with respect to each other, said control means including a cam shaft having a cam member for releasing the spring-loaded clutch means and a cam member for actuating the spring-release brake means, and adjustable bell crank means arranged to cooperate with the cam member for releasing the spring-loaded clutch means, said bell crank means embodying two interengaged bell cranks supported on a single shaft, said bell cranks having their one arms adjustably engaged with each other, one bell crank having the other arm engaged with the spring-loaded clutch means and the other bell crank having the other arm contacting with the cam member releasing the spring-loaded clutch means.

References Cited in the file of this patent

UNITED STATES PATENTS

| | | |
|---|---|---|
| 763,548 | Ferguson | June 28, 1904 |
| 1,463,445 | Smith | July 31, 1923 |
| 1,707,053 | Dillon | Mar. 26, 1929 |
| 1,773,696 | Robertson | Aug. 19, 1930 |
| 2,366,433 | Bridwell et al. | Jan. 2, 1945 |
| 2,370,597 | Wallerstein | Feb. 27, 1945 |
| 2,401,518 | Smith et al. | June 4, 1946 |
| 2,488,756 | Baker | Nov. 22, 1949 |
| 2,587,015 | Walter | Feb. 26, 1952 |
| 2,633,938 | Rodger et al. | Apr. 7, 1953 |
| 2,656,904 | Grenier | Oct. 27, 1953 |